March 4, 1947.  G. H. BROWN ET AL  2,416,977
RADIO FREQUENCY WATTMETER
Filed Dec. 31, 1943

INVENTORS.
George H. Brown &
BY Rudolph A. Bierwirth
ATTORNEY

Patented Mar. 4, 1947

2,416,977

UNITED STATES PATENT OFFICE 2,416,977

RADIO FREQUENCY WATTMETER

George H. Brown, Princeton, and Rudolph A. Bierwirth, Kingston, N. J., assignors to Radio Corporation of America, a corporation of Delaware Application December 31, 1943, Serial No. 516,422

7 Claims. (Cl. 171—95)

This invention relates generally to radio frequency apparatus and more particularly to an improved radio frequency wattmeter providing accurate measurements of radio frequency power including reactive components over a wide frequency range. The invention is an improvement over a prior art radio frequency wattmeter described in French Patent No. 834,436. In order that the theory of operation of the improved wattmeter may be understood clearly, a slightly modified circuit of the type disclosed in the French patent will be described herein and the theory of operation thereof explained.

Among the objects of the invention are to provide an improved method of and means for measuring radio frequency power. Another object of the invention is to provide an improved radio frequency wattmeter having relatively low power dissipation and providing accurate measurements of radio frequency power over a wide frequency range. Another object of the invention is to provide an improved radio frequency wattmeter for measuring radio frequency energy having reactive components over a relatively wide frequency range. A further object of the invention is to provide an improved radio frequency wattmeter network including an inductive current measuring circuit and a capacitive voltage measuring circuit for deriving and combining currents characteristic of the current, voltage, and phase angle of the radio frequency energy to be measured. An additional object of the invention is to provide an improved radio frequency wattmeter employing paired thermocouples for combining and measuring radio frequency power including reactive components and covering a wide frequency range. A still further object of the invention is to provide an improved radio frequency wattmeter which includes a phase shift compensating network for extending the useful measurement frequency range of the wattmeter network.

Figure 1:
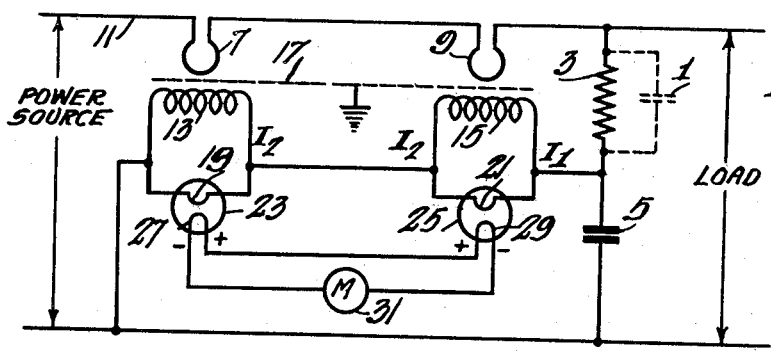
Figure 2:
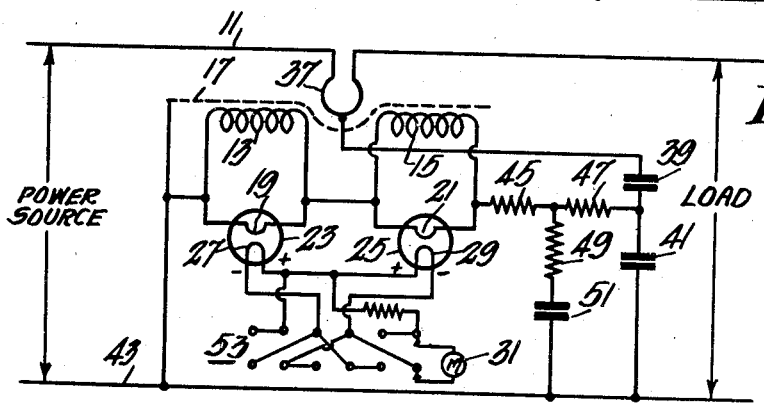
Figure 3:
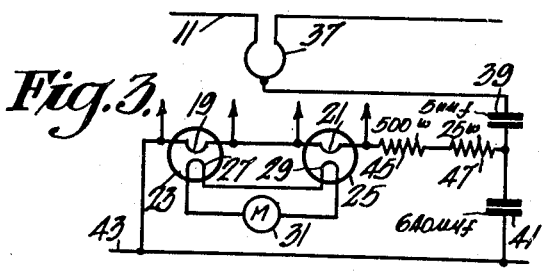
Figure 4:
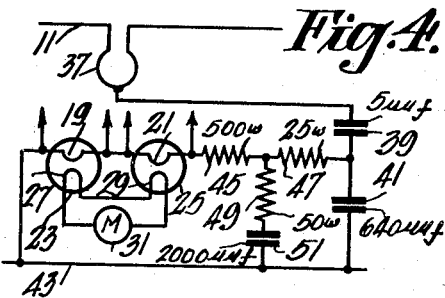
Figure 5:
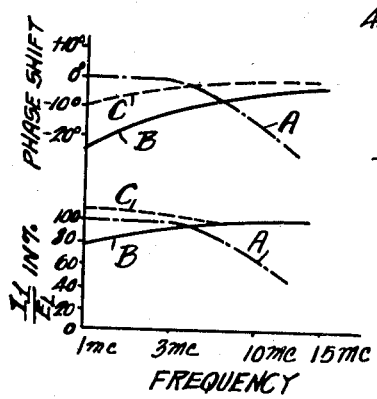

The invention will be described in further detail by reference to the accompanying drawing of which Figure 1 is a schematic circuit diagram of a modified circuit of the general type known in the prior art, Figure 2 is a schematic circuit diagram of a preferred embodiment of the invention, Figure 3 is a fragmentary schematic circuit diagram of the voltage measuring portion of the circuit of Figure 2, Figure 4 is a fragmentary schematic circuit diagram of the voltage measuring portion and the phase shift compensating network of the circuit of Figure 2, and Figure 5 is a family of graphs illustrating the operational characteristics of the several circuits. Similar reference characters are applied to similar elements throughout the drawing.

Referring to Figure 1 of the drawing, the circuit shown is essentially the same as the circuit disclosed in the French Patent 834,436, with the exception that the distributed capacity 1 across the resistor 3, and the series capacitor 5 connected between one terminal of the resistor 3 and the grounded side of the power transmission line, which were not considered in the patent, are essential if the device is to be used in accurate power measurements of the higher radio frequencies. The distributed capacity 1 is the inevitable stray capacitance of the resistor 3, while the series capacitor 5 is a phase correcting capacitor which has been added to the circuit.

The current measuring components of the radio frequency power to be measured are derived from two serially-connected low inductance inductors 7, 9 inserted in one conductor 11 of a radio frequency power transmission line. Current transformer secondary windings 13, 15—electrostatically shielded by means of a shield 17 from the inductors 7, 9 respectively—are serially connected in phase opposition to series-connected heater elements 19, 21 of a pair of thermocouples 23, 25.

Currents, characteristic of the line voltage and the phase angle with respect to the line current of the radio frequency power to be measured, are derived from across the capacitor 5 which is serially connected with the power resistor 3 across the output of the power transmission line. The thermocouple junctions 27, 29 of the thermocouples 23, 25 respectively, are serially connected through a sensitive current measuring instrument 31. Essentially, one of the objects of the circuit is to obtain a current $I_1$ through each of the thermocouple heater elements 19, 21 wherein said current $I_1$ is always proportional to the power line voltage and has a known constant phase relation with said line voltage for a given frequency. Another object of the circuit is to derive a current $I_2$ in each heater element 19, 21 of the thermocouples which current is proportional to the power line current and in constant phase relationship with said line current for a given frequency. The phase relation between the current $I_1$ and the current $I_2$ must always be the same as the phase difference which exists between the line voltage and the line current.

The current transformer secondary windings 13, 15 being connected in phase opposition, the total current in the heater element 19 of the first thermocouple 23 will be $I_1-I_2$, and the total current in the heater element 21 of the second thermocouple 25 will be $I_1+I_2$. The phase opposing inductive currents $I_2$ in the series connected thermocouple heater elements 19, 21, thereby provide no potential across the capacitor 5 due to the inductive current $I_2$, so that the characteristics of the capacitor 5 need not be considered in dealing with the inductive current. Similarly, any effect of the power resistor 3 on the inductive current $I_2$ also may be neglected, since the resistance of the resistor 3 is selected to be relatively high as compared to the impedance of the current transformers and the heater elements.

The currents $I_2$ is (1) $$\bar{I}_2 = \frac{j\omega M \bar{I}_L}{R_2 + j\omega L_2}$$

where $\bar{I}_L$ = the line current.
M = mutual inductance between primary and secondary windings of the current transformer.
$L_2$ = the inductance of the secondary circuit of the current transformer.
$R_2$ = the resistance of the secondary circuit (this resistance is almost entirely that of the thermocouple heater).
$\omega = 2\pi f$.
$f$ = frequency of the power source.

Equation 1 may be written (2) $$\bar{I}_2 = \frac{j\omega M \bar{I}_L}{j\omega L_2 \left[1 + \frac{R_2}{j\omega L_2}\right]} = \frac{M\bar{I}_L \angle + \beta}{L_2 \sqrt{1 + \left(\frac{R_2}{\omega L_2}\right)^2}}$$

where (3) $$\beta = \tan^{-1}\left(\frac{R_2}{\omega L_2}\right)$$

From (2) we see that as long as $R_2/\omega L_2$ is small compared to unity, the magnitude of $I_2$ is proportional to line current and independent of frequency. Even when $R_2/\omega L_2$ is as large as 0.1, the change from the perfect condition is only one-half of one percent. The current $I_2$ leads the line current by an angle $\beta$ which is dependent upon the frequency. The effect of this shift will not be considered further until we examine the factors which influence $I_1$.

The current $I_1$, corresponding to the characteristics of the line voltage, may be calculated as follows: The current delivered to the thermocouple heater elements in response to the line voltage $E_L$ is nearly independent of the characteristics of the two current transformer secondary windings 13, 15, by virtue of the fact that the resistor 3 has relatively high resistance $R_1$ with respect to the transformer windings. Therefore, the total current $I_0$ due to the line voltage is (4) $$\bar{I}_0 = \bar{E}_L \left[\frac{1}{R_1} + j\omega C_1\right]$$

where $I_0$ is the total current through the thermocouple heaters, the transformer secondaries, and the capacitor 5, and $C_1$ is the distributed capacitance 1 across the resistor 3. The voltage $\bar{E}_s$ across the two current transformer secondaries in series is related to $I_1$ by the relation (5) $$\bar{I}_0 = \bar{E}_s\left[\frac{1}{2R_2} + \frac{1}{j2\omega L_2} + j\omega C_2\right]$$

where $C_2$ is the capacitance of the capacitor 5. But (6) $$\bar{E}_s = 2R_2 \bar{I}_1$$

Substituting (6) in (5), and equating (4) and (5), we find that (7) $$\bar{I}_1 = \frac{\bar{E}_L}{2R_2} \frac{\left[\frac{1}{R_1} + j\omega C_1\right]}{\left[\frac{1}{2R_2} + \frac{1}{j2\omega L_2} + j\omega C_2\right]}$$

or (8) $$\bar{I}_1 = \frac{\bar{E}_L}{R_1} \frac{[1 + j\omega C_1 R_1]}{\left[1 + \frac{R_2}{j\omega L_2} + j2\omega C_2 R_2\right]}$$

Now (9) $$\left[1 + \frac{R_2}{j\omega L_2}\right][1 + j2\omega C_2 R_2] =$$
$$1 + \frac{R_2}{j\omega L_2} + j(2\omega C_2 R_2) + \left(\frac{R_2}{\omega L_2}\right)(2\omega C_2 R_2)$$

If $R_2/\omega L_2$ and $2\omega C_2 R_2$ are both small compared to unity, the product at the end of (9) may be dropped so that

(10) $$\left[1 + \frac{R_2}{j\omega L_2}\right][1 + j2\omega C_2 R_2] = 1 + \frac{R_2}{j\omega L_2} + j2\omega C_2 R_2$$

This relation makes (8) become

(11) $$\bar{I}_1 = \frac{\bar{E}_L}{R_1} \frac{1 + j\omega C_1 R_1}{\left[1 + \frac{R_2}{j\omega L_2}\right][1 + j2\omega C_2 R_2]}$$

Next we choose $C_2$ of such a value that

(12) $$C_1 R_1 = 2 C_2 R_2$$

and (11) reduces to

(13) $$\bar{I}_1 = \frac{\bar{E}_L}{R_1} \frac{1}{\left[1 + \frac{R_2}{j\omega L_2}\right]} = \frac{\bar{E}_L \angle + \beta}{R_1 \sqrt{1 + \left(\frac{R_2}{\omega L_2}\right)^2}}$$

where

(14) $$\beta = \tan^{-1}\left(\frac{R_2}{\omega L_2}\right)$$

From (13) we see that the current $I_1$ is proportional to line voltage and independent of frequency as long as $R_2/\omega L_2$ is small compared to unity. This current leads the line voltage by an angle which is the same angle by which $I_2$ leads the line current.

The circuit thus described provides accurate measurements of radio frequency power over a comparatively wide radio frequency range, but the circuit has two disadvantages which have been overcome in applicants' improved circuit to be described in detail hereinafter. One disadvantage of the prior art circuit is that the two serially-connected line inductors 7, 9 provide undesirable relative phase shift at the higher radio frequencies. A second disadvantage of the prior art circuit is that considerable power is dissipated in the power resistor 3 thereby requiring a resistor having large physical dimensions which results in high stray capacity effects and heat dissipation problems. The modified prior art circuit provides satisfactory power measurement over a frequency range of 500 to 2000 kilocycles, but the measurement error increases above this range.

Referring to Figures 2, 3 and 4, a single center-tapped inductor 37 is electrostatically shielded from and inductively coupled to two similar current transformer secondary windings 13, 15, which are coupled to the line inductor 37 in phase opposition to each other. The serially-connected heater elements 19, 21 are serially connected, respectively, to the current transformer secondary windings 13, 15, as described in Figure 1, to provide currents $I_2$ in phase opposition in each of the heater elements 19, 21.

A capacitive voltage divider, comprising a relatively small capacitor 39 and a larger capacitor 41, is serially connected between the center tap of the line inductor 37 and the grounded, or other, conductor 43 of the power transmission line. If desired, the inductor center tap may be omitted, and the capacitive divider may be connected between either end of the inductor 37 and the grounded conductor 43. Currents $I_1$ proportional to the line voltage are derived from the junction of the capacitors 39, 41 of the voltage divider and applied to the serially-connected thermocouple heater elements 19, 21 through a pair of serially-connected resistors 45, 47. The larger capacitor 41 is selected so that its reactance is small compared to the resistance of the resistors 45, 47, whereby the voltage across the larger capacitor 41 is essentially proportional to the line voltage.

In order to compensate for phase shift between the currents $I_1$ and the line voltage $E_L$ as the measured frequency is decreased, a phase shift compensating network, comprising a serially-connected third resistor 49 and third capacitor 51, is connected between the junction of the first and second resistors 45, 47 and the grounded conductor 43 of the power transmission line. This phase compensating circuit may be designed to overcompensate somewhat in order to provide amplitude compensation for the decreased coupling between the line inductor 37 and the current transformer secondary windings 13, 15, as the line frequency decreases.

If desired, a multi-position switch 53 may be employed to switch the meter 31 to indicate current derived from either or both of the thermocouple junctions 27, 29 for balancing the coupling between the transformer secondary windings 13, 15 and the line inductor 37.

Figure 3 shows the portion of the circuit of Figure 2 wherein the current $I_1$ is derived from the junction of the capacitors 39, 41 connected between the center tap of the line inductor 37 and the grounded conductor 43 of the power transmission line. It will be seen that the first and second resistors 45, 47 are serially-connected with the heater elements 19, 21 of the thermocouples 23, 25 respectively, and that the current $I_1$ will be proportional to the portion of the line voltage across the second capacitor 41.

The circuit of Figure 4 includes the portion of the circuit of Figure 2 which is also shown in Figure 3, and, in addition, includes the phase shift compensating circuit comprising the serially-connected third resistor 49 and third capacitor 51 which are connected between the junction of the first and second resistors 45, 47 and the grounded conductor 43 of the power transmission line.

Figure 5 is a family of graphs illustrating the phase shift with respect to frequency and the percentage of the true ratio of the current $I_1$ to the line voltage $E_L$ with respect to frequency, for the circuits described heretofore. Graphs A indicate the phase shift and the percentage of true $$\frac{I_1}{E_L}$$

of the circuit of Figure 1 wherein accurate measurements are obtained over the frequency range from below 1 megacycle to about 3 megacycles. Graph B illustrates the operating characteristics of the circuit of Figure 2 having the voltage measuring circuit of Figure 3 but not including the phase shift compensating circuit. It will be seen that accurate power measurements are obtainable from about 3 megacycles to over 15 megacycles but that the phase shift occurring at the lower frequencies provides measurement errors which are objectionable. Graph C indicates the compensating characteristics added to the circuit of Figure 2 when the phase shift compensating network including the third resistor 49 and the third capacitor 51 are added to the circuit. The higher frequency power measuring characteristics of the circuit remain unchanged, but the compensating network provides accurate power measurements over the lower frequency range. As explained heretofore, the phase shift compensating circuit may provide overcompensation to correct for the decrease in coupling between the line inductor 37 and the current transformer secondary windings 13, 15, and thereby to compensate for amplitude variations of $I_2$ due to the relatively low reactance of the current transformer secondary windings at the lower frequencies with respect to the fixed resistances of the thermocouple heater elements.

Thus the invention described comprises an improved radio frequency power measuring circuit providing accurate indications of radio frequency power including reactive components over a wide frequency range. The improvements over the prior art devices include more efficient voltage measuring circuits and phase shift compensating circuits to improve the frequency response of the network.

We claim as our invention:

1. A wide frequency range radio frequency wattmeter for a power transmission line including an inductor having end terminals for connection in series with said line, said inductor having an intermediate terminal, means including separate oppositely-phased current pickup means each coupled inductively to said inductor for deriving substantially oppositely-phased currents proportional to the current in said line, a pair of current-responsive devices serially connected to said current pickup means, a capacitive voltage divider connected to said intermediate terminal of said inductor responsive to the voltage across said line, resistive means for applying at least a portion of said voltage across said voltage divider to said current-responsive devices, an indicator responsive to the difference of the currents derived from said current-responsive devices for indicating said transmitted radio frequency power, and a resistive-capacitive network connected to said resistive means for providing compensation for phase shift with variation of said power line frequency over a relatively wide frequency range.

2. A radio frequency wattmeter comprising a single inductor having end terminals for connection in series with a radio frequency power circuit energizing a load, said inductor having an intermediate tap, separate oppositely-phased current pickup means each coupled inductively to said inductor, a pair of current-responsive means serially connected to said current pickup means, capacitive voltage dividing means connected from said intermediate tap on said inductor to a point of reference potential, a resistive network for applying at least a portion of the voltage across said voltage divider to said current responsive means, an indicator responsive to the difference of the currents derived from said current responsive means for indicating the power transmitted to said load, and a resistive-capacitive network connected between an intermediate point on said resistive network and said point of reference potential, said resistive network and said resistive-capacitive network providing compensation for phase shift with variation of said power circuit frequency over a relatively wide frequency range.

3. A radio frequency wattmeter comprising a single substantially center tapped inductor for connection in series with a radio frequency power circuit energizing a load, separate oppositely-phased current pickup means each coupled inductively to said inductor, a pair of current-responsive means serially connected to said current pickup means, capacitive voltage dividing means connected from said center tap of said inductor to a point of reference potential, a resistive network for applying at least a portion of the voltage across said voltage divider to said current responsive means, an indicator responsive to the difference of the currents derived from said current responsive means for indicating the power transmitted to said load, and a resistive-capacitive network connected between an intermediate point on said resistive network and said point of reference potential, said resistive network and said resistive-capacitive network providing compensation for phase shift with variation of said power circuit frequency over a relatively wide frequency range.

4. A radio frequency wattmeter comprising a single substantially center tapped inductor for connection in series with a radio frequency power circuit energizing a load, separate oppositely-phased current pickup means each coupled inductively to said inductor, a pair of current-responsive means serially connected to said current pickup means, capacitive voltage dividing means connected from said center tap of said inductor to a point of reference potential, a resistive network connecting an intermediate point on said voltage divider to one of said current-responsive means, means connecting the other of said serially-connected current responsive means to said point of reference potential, an indicator responsive to the difference of the currents derived from said current responsive means for indicating the power transmitted to said load, and a resistive-capacitive network connected between an intermediate point on said resistive network and said point of reference potential, said resistive network and said resistive-capacitive network providing compensation for phase shift with variation of said power circuit frequency over a relatively wide frequency range.

5. An ultra-high-frequency network for measuring the power applied through at least a two conductor transmission line to a load, said network including a single inductive element serially connected in one of the conductors of said line, said element having a tap intermediate its ends, a pair of serially-connected oppositely-phased inductive secondary windings inductively coupled to said inductive element, a capacitive voltage divider, means connecting said voltage divider between said tap of said inductive element and another conductor of said line, a resistive network connecting said voltage divider to one of said secondary windings, means connecting said other secondary winding to another of said line conductors, a resistive-capacitive network connecting said resistive network to said other line conductor, separate thermocouples each having a heater element connected to different ones of said secondary windings and having their thermal responsive generating elements serially connected in opposite polarity, and a meter responsive to currents generated by said oppositely polarized thermocouple generating elements for indicating the ultra-high-frequency power transmitted to said load.

6. Apparatus of the type described in claim 1 including electrostatic shielding means interposed between said inductor and said current pickup means.

7. Apparatus of the type described in claim 5 including electrostatic shielding means interposed between said tapped inductive element and said secondary windings.

GEORGE H. BROWN.
RUDOLPH A. BIERWIRTH.

REFERENCES CITED

The following references are of record in the file of this patent:

UNITED STATES PATENTS

| Number | Name | Date |
| --- | --- | --- |
| 1,895,812 | Morecroft | Jan. 31, 1933 |
| 2,269,225 | Rich | Jan. 6, 1942 |
| 2,285,211 | Korman | June 2, 1942 |
| 2,278,687 | Brown | Apr. 7, 1942 |
| 2,270,764 | Norgaard | Jan. 20, 1942 |
| 2,289,666 | Maguire | July 14, 1942 |
| 2,371,395 | Keeling | Mar. 13, 1945 |

FOREIGN PATENTS

| Number | Country | Date |
| --- | --- | --- |
| 834,436 | French | Aug. 16, 1938 |
| 427,037 | German | Mar. 22, 1926 |